United States Patent
Tabachenko et al.

[19]

[11] Patent Number: 6,073,940
[45] Date of Patent: Jun. 13, 2000

[54] SEALED CHUCK ASSEMBLY

[75] Inventors: Oleg Tabachenko, Fairlawn, N.J.; Fernand U. Boisse, Bristol, Conn.

[73] Assignee: The Goss & DeLeeuw Machine Company, Kensington, Conn.

[21] Appl. No.: 09/021,886

[22] Filed: Feb. 11, 1998

[51] Int. Cl.$^7$ ...................................................... B23B 31/16
[52] U.S. Cl. ........................... 279/157; 279/110; 279/123
[58] Field of Search ................................... 279/157, 110, 279/123, 112–122

[56] References Cited

U.S. PATENT DOCUMENTS

| | | | |
|---|---|---|---|
| 2,538,521 | 1/1951 | Huntting | 279/157 |
| 3,251,606 | 5/1966 | Oswald et al. | 279/123 |
| 3,904,214 | 9/1975 | Manchester | 279/110 |
| 3,963,249 | 6/1976 | Fink | 279/157 |

FOREIGN PATENT DOCUMENTS

| | | | |
|---|---|---|---|
| 61-125710 | 6/1986 | Japan | 279/157 |
| WO 96/29170 | 9/1996 | WIPO | |

OTHER PUBLICATIONS

RSR AdTec Ltd. Hydraulic Chuck—Advertisement (undated).
MicroCentric RC sealed rubber cover air chucks—Advertisement (undated).

Primary Examiner—Steven C. Bishop
Attorney, Agent, or Firm—McCormick, Paulding & Huber

[57] ABSTRACT

A sealed chuck assembly having a hollow cylindrical chuck body including a radially disposed front wall and a plurality of master jaws supported on the chuck body to move radially within openings in the front wall and relative to the chuck body in response to operation of a jaw actuating mechanism contained within the chuck body. A canopy plate attached to the chuck body overlies the front wall and has apertures therethrough in general registry with the openings. The master jaws are exposed within the apertures to facilitate attachment of a top jaw to each master jaw. Annular sealing members disposed between the rear surface of the canopy plate and forwardly facing surfaces on the master jaws seal each of the openings in all positions of the master jaws relative to the chuck body. Top jaws may be secured to and removed from the master jaws without disturbing the sealing members so that the openings in the front wall of the chuck body remain in sealed condition at all times.

19 Claims, 2 Drawing Sheets

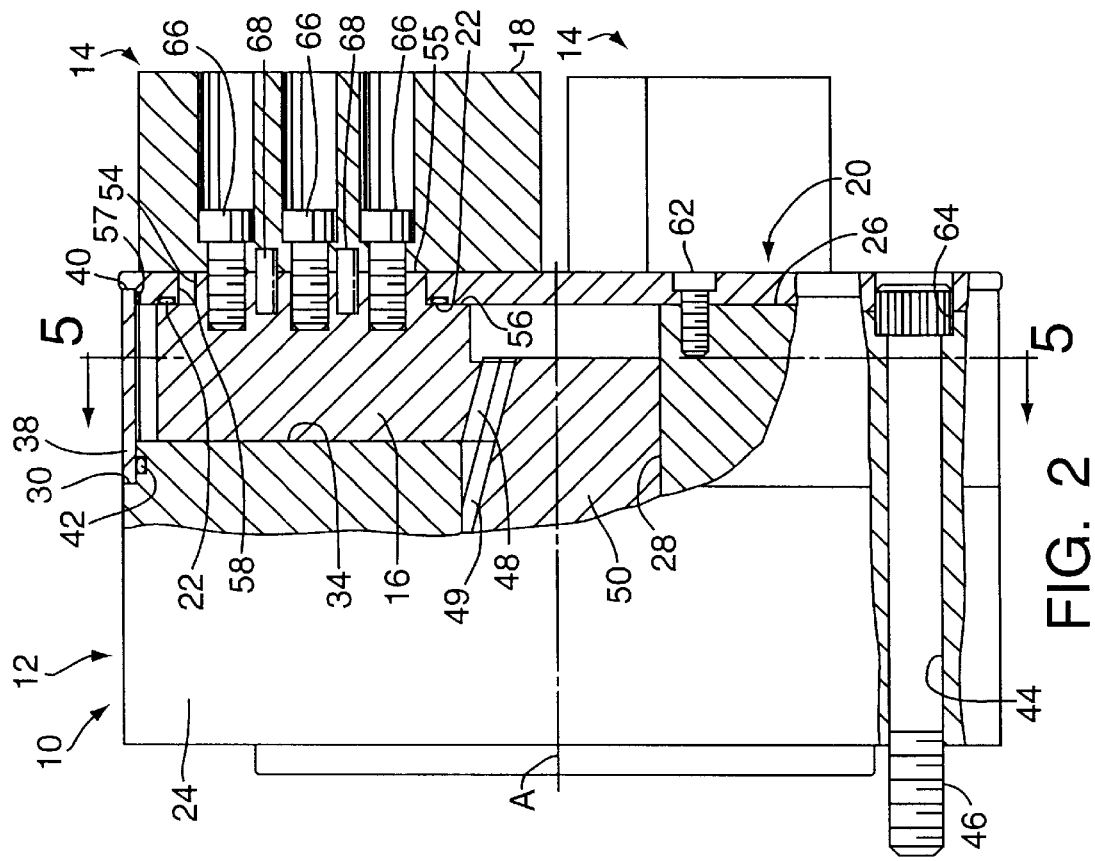
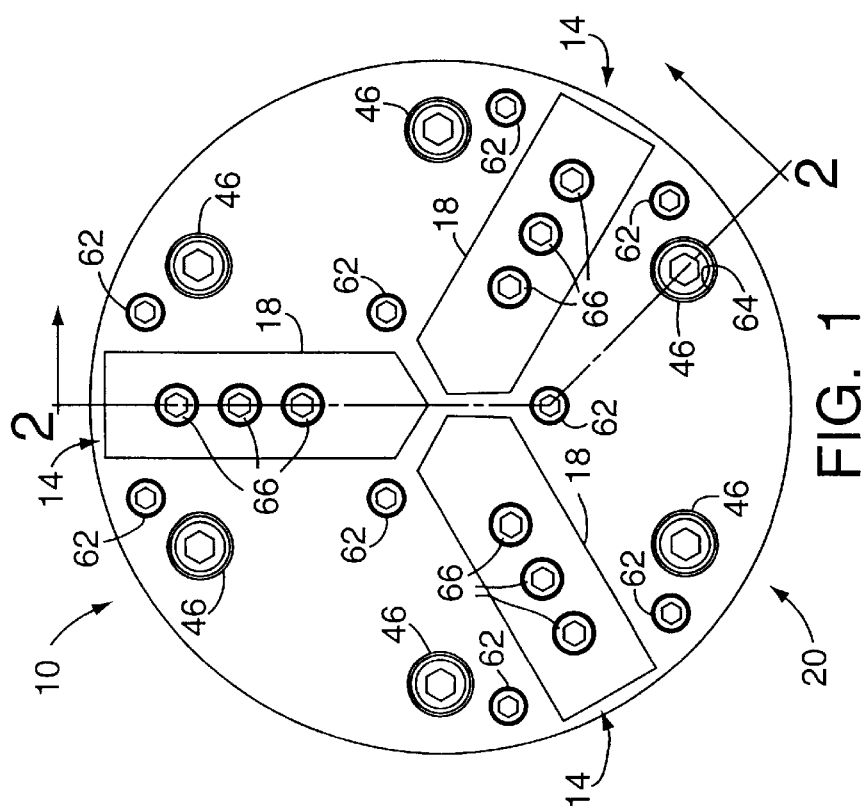

SEALED CHUCK ASSEMBLY

FIELD OF INVENTION

This invention relates in general to chucks assemblies and deals more particularly with improvements in sealed precision chuck assemblies for machine tools.

BACKGROUND OF THE INVENTION

Sealed chuck assemblies of the type with which the present invention is concerned are usually generally cylindrical and have radially reciprocally movable jaw assemblies which include removable top jaws carried by master jaws mounted within a chuck body containing a jaw actuating mechanism. Such precision chuck assemblies often operate in hostile environments where fine chips and/or abrasive particles produced by associated machining operations are present and may enter a chuck causing moving parts of the chuck to wear prematurely, resulting in a loss of chucking accuracy and requiring chuck maintenance and/or part replacement. Such problems are a frequent source of costly machine down time and may result in poor workpiece quality or workpiece spoilage.

Heretofore, sealed chuck assemblies have been provided to control the aforesaid problem. At least one such chuck assembly, marketed by Micro Centric Corporation, New York, N.Y., is sealed by a rubber cover or boot which substantially surrounds the entire chuck body. However, this chuck cover is exposed to the risk of possible damage at all times. Any damage to the chuck cover which causes loss of sealing integrity will generally necessitate removal and replacement of the entire chuck cover.

Another machine tool chuck assembly of a sealed type has a hollow chuck body containing a jaw operating mechanism and a master jaws supported for movement within openings in the face of the chuck body. Removable top jaws releasably secured to the master jaws cooperate with annular seals mounted on the face of the chuck body to seal the openings in the face. The top jaws must usually be changed each time a new machine tool setup is made, thereby exposing the openings in the chuck body. Since top jaw changes are usually made with the chuck assembly mounted on an associated machine tool, the openings in the face of the chuck body are likely to be frequently exposed to entry of contaminants such as chips and/or airborne abrasive dust particles produced by normal operation of the machine. Such a sealed chuck assembly is illustrated and described in international application WO96/29170, published under the Patent Cooperation Treaty (PCT), Sep. 26, 1996.

Accordingly, it is the general aim of the present invention to provide an improved sealed chuck assembly of a type having movable master jaws, top jaws releasably secured to and carried by the master jaws, and seals which remain in sealed condition in all positions of the master jaws and when the top jaws are removed from the master jaws to facilitate jaw changes.

SUMMARY OF THE INVENTION

In accordance with the present invention. a sealed chuck assembly has a hollow chuck body including a front wall. A plurality of master jaws supported by the chuck body and exposed at openings in the front wall of the chuck body move relative to the chuck body generally toward or away from each other in response to operation of a jaw actuating mechanism contained within the hollow chuck body. A canopy plate fastened to the chuck body has a rear wall generally overlying the front wall of the chuck body and defines a plurality of apertures equal in number to the master jaws. A portion of each master jaw is exposed at an associated aperture to facilitate releasable attachment of a top jaw to the exposed portion of the master jaw. A plurality of annular sealing members, equal in number to the apertures, are positional between the canopy plate and the master jaws. Each annular sealing member surrounds an associated one of the apertures and is disposed in sealing engagement with the rear surface of the canopy plate and an associated forwardly facing sealing surface on one of the master jaws. The sealing members cooperate with the canopy plate and the master jaws to seal the peripheral portion of each aperture in all positions of the master jaws relative to the chuck body.

BRIEF DESCRIPTION OF THE DRAWINGS

FIG. 1 is a front elevational view of a chuck assembly embodying the present invention.

FIG. 2 is a side elevational view of the chuck assembly shown partially in axial section taken generally along the line 2—2 of FIG. 1.

DETAILED DESCRIPTION OF PREFERRED EMBODIMENT

Figure 3:
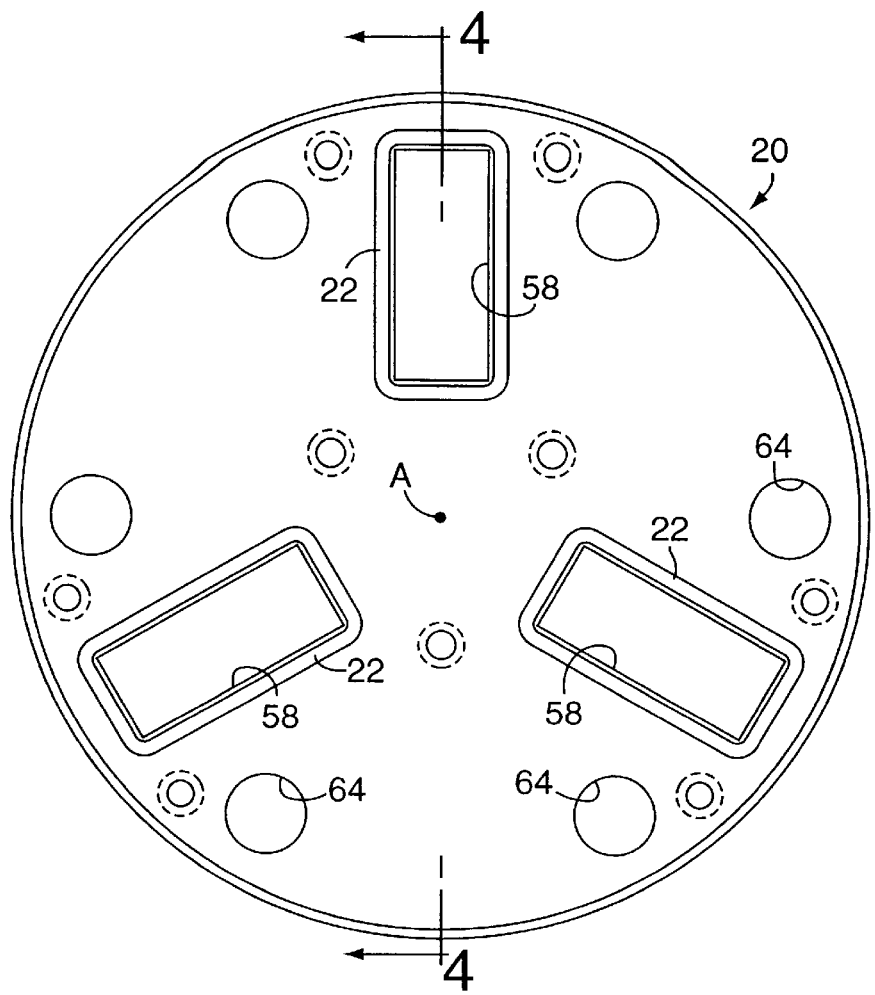
FIG. 3 is a rear elevational view of the canopy plate shown with annular jaw sealing members mounted thereon.
Figure 4:
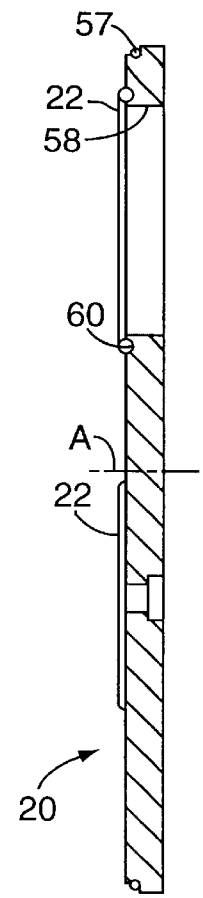
FIG. 4 is a sectional view taken along the line 4—4 of FIG. 3.

Although the present invention may be practiced with chuck assemblies of various types, in the drawings and in the description which follows the invention is illustrated and described with reference to a sealed cylindrical three jaw chuck assembly indicated generally by the reference numeral 10 and having a jaw actuating mechanism of a well known type operated by a drawbar (not shown). The illustrated chuck assembly 10 is particularly suitable for use on a machine tool (not shown) and essentially comprises a hollow chuck body assembly, designated generally by the numeral 12, supporting three movable jaw assemblies, indicated generally at 14, 14. Each jaw assembly 14 includes a master jaw 16 and a top jaw 18, releasably secured to the master jaw 16. The master jaws 16, 16 are exposed at openings in the body assembly and move within the openings and relative to the chuck body assembly 12 in response to operation of the jaw actuating mechanism contained within the chuck body assembly. A canopy plate indicated generally at 20, mounted in fixed position on the body assembly 12, carries sealing members 22, 22 which cooperate in sealing engagement with the movable master jaws 16, 16 to seal the aforementioned openings in the body assembly 12 against entry of contaminants, such as machined chips and abrasive dust, produced in normal machining operations. Thus, the chuck assembly 10 is constructed and arranged to protect the movable master jaws and the jaw actuating mechanism contained within of the hollow chuck body assembly against excessive wear, all of which will be hereinafter more fully discussed.

Figure 5:
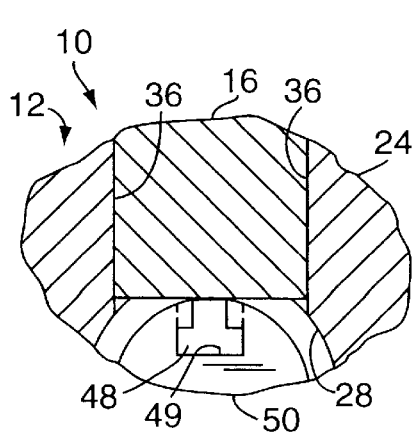
FIG. 5 is a somewhat enlarged fragmentary sectional view taken generally along the line 5—5 of FIG. 2.
Figure 6:
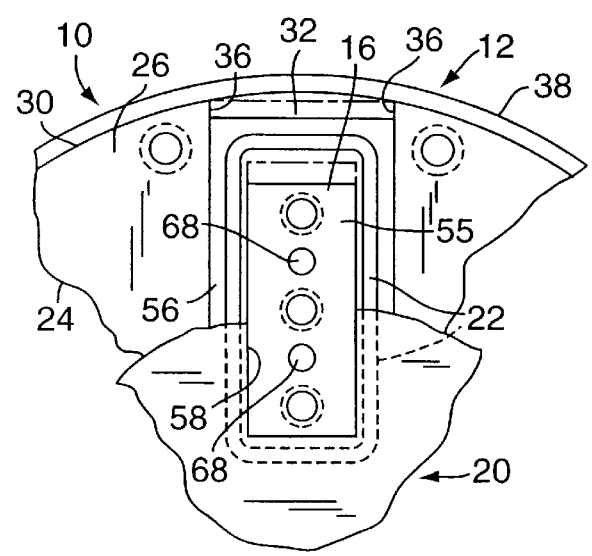
FIG. 6 is a fragmentary front elevational view of the chuck assembly shown with a top jaw removed and a portion of the canopy plate broken away to reveal structure therebehind.

Considering now the chuck assembly 10 in further detail, the chuck body assembly 12 includes a generally cylindrical chuck body 24 and has a central axis indicated by the letter A and best shown in FIG. 2. The chuck body 24 has a radial disposed and forwardly facing frontal surface 26 and a generally cylindrical bore 28 which extends coaxially through it. A stepped coaxial annular recess 30 opens radially outwardly and through the forward end portion of the chuck body 24 at the frontal surface 26. Three equiangularly spaced and radially extending openings or slots 32, 32 formed in the chuck body communicate with the bore 28 and open radially outwardly into the annular recess 30 and through the frontal surface 26. Each radially extending slot 32 is defined by a radial disposed and forwardly facing inner end wall 34, shown in FIG. 2, and a pair of substantially parallel opposing side walls 36, 36, shown in FIGS. 5 and 6.

The chuck body assembly 12 further includes a generally cylindrical tubular sleeve or shroud 38 coaxially mounted on the chuck body 24 and disposed within and generally complementing the annular recess 30. The shroud 38 forms a forward extension of the cylindrical peripheral surface of the chuck body 24 and provides closures for the outer ends of the radially outwardly open slots 32, 32. The shroud 38 extends for some axial distance forwardly beyond the chuck body frontal surface 26 and has a radially disposed forwardly facing front end surface 40 shown in FIG. 2. The rear end portion of the shroud 38 is sealed in engagement with the chuck body by an elastomeric O-ring sealing member 42, preferably made from a synthetic elastomeric material, such as a buna rubber, and received within a coaxial radially outwardly open annular sealing recess in the chuck body 24. The elastomeric O-ring 42 coaxially surrounds the chuck body and bears in sealing engagement against an associated inner surface portion of the shroud 38, as best shown in FIG. 2, thereby sealing the rear end portion of the shroud to the chuck body 24. An equiangular spaced series of counterbored fastener receiving openings 44, 44 extend through he chuck body 24 in parallel relation to the axis A to receive headed mounting fasteners for securing the chuck assembly 10 to the spindle of an associated machine tool (not shown). A typical mounting fastener is shown in FIG. 2 and indicated by the numeral 46.

A typical jaw assembly 14, shown in FIG. 2, which includes master jaw 16, is received within and complements at least a portion of an associated slot 32 within which it is supported for radial movement relative to the chuck body 24 and generally toward and away from the axis A. The illustrated master jaw 16 has a T-shaped tail piece or connecting portion 48 at its radially inner end which is received in and complements an associated rearwardly and radially outwardly inclined T-slot 49 in an associated jaw actuating member 50 supported for axially reciprocal sliding movement within the bore 28. The master jaw 16 preferably includes an integral boss 54 which projects forwardly beyond the frontal surface 26 and terminates at a forwardly facing seating surface 55 disposed within a radial plane relative to the chuck axis A. The illustrated boss 54 is located generally centrally of the master jaw and is surrounded by a forwardly facing annular sealing surface 56 defined by the master jaw 16 and disposed generally within the plane of the frontal surface 26, as best shown in FIG. 2.

In accordance with the present invention, the generally cylindrical canopy plate 20 is secured in fixed position adjacent the chuck body frontal surface 26 and carries the sealing members 22, 22 which cooperate with the sealing surfaces on the master jaws 16, 16 to seal the openings through the frontal surface 26 formed by the slots 32, 32 and within which the master jaws are exposed. A reduced diameter portion of the canopy plate positioned within the forward end of the shroud 38 is sealed to the shroud by another elastomeric O-ring seal 57 which coaxially surrounds the reduced diameter portion and bears in sealing engagement against an associated portion of the cylindrical inner surface of the shroud 38 proximate the forward end of the shroud. The canopy plate 20 has three equiangularly spaced and preferably generally rectangular apertures 58, 58 therethrough in general registry with the slots 32, 32. Each aperture 58 receives the rectangular boss 54 on an associated master jaw 16. The radial length of each aperture 58 is somewhat greater than the radial dimension of an associated boss 54. However, the width of each rectangular aperture 58 is preferably substantially equal to the width of the rectangular boss 54 received therein. Thus, the canopy plate 20 is constructed and arranged to permit limited movement of the master jaws 16, 16 within the apertures 58, 58 and relative to the canopy plate in radial directions generally toward and away from the chuck body central axis A.

Each aperture 58 is surrounded by an annular elastomeric sealing member 22, preferably formed from a synthetic material, such as buna rubber, and partially received within a rearwardly open annular seal recess 60 formed within the rearwardly facing surface of the canopy plate, as shown in FIG. 3. Each sealing member 22 cooperates in sealing engagement with the forwardly facing annular sealing surface 56 on an associated master jaw 16 when the canopy plate 20 is secured to the chuck body.

The canopy plate 20 is secured in fixed position to the chuck body 24 by a plurality of threaded fasteners 62, 62 which pass through equiangularly spaced apart counterbored apertures in the canopy plate and threadably engage the chuck body, as best shown in FIGS. 1 and 2. A plurality of equiangularly spaced cylindrical openings 64, 64, through the canopy plate 20 receive the heads of the fasteners 46, 46 which pass freely therethrough to secure the chuck assembly 12 to an associated machine tool. The fasteners 46, 46, which are secured in the field, do not bear upon the canopy plate 20 and therefore do not exert influence upon the sealing members 22, 22.

Each top jaw 18 rests on the seating surface 55 of an associated master jaw 16 and is secured to its associated master jaw by fasteners 66, 66 which threadably engage the master jaw. A pair of dowel pins 68, 68 carried by the master jaw and received within bore openings in the top jaw assure precise alignment of the top jaw with its associated master jaw, substantially as shown in FIG. 2. Since each sealing member 22 is at all times in sealing engagement with the sealing surface 56 on an associated master jaw 16, the openings through the frontal surface 26 remain in sealed condition in all positions of the master jaws relative to the chuck body and the chuck 10 remains in sealed condition even when the top jaws are removed from the master jaws.

We claim:

1. In a chuck assembly including a hollow chuck body defining a frontal surface, the frontal surface having an opening therethrough communicating with the interior of the chuck body, a master jaw supported by said chuck body and exposed at the opening for movement relative to the chuck body the chuck body in one direction and in another direction opposite the one direction, and jaw actuating means within the chuck body for moving the master jaw in the one direction and in the other direction opposite the one direction, the improvement comprising a canopy plate having a rear surface generally overlying said frontal surface, said canopy plate having an aperture therethrough in general registry with said opening, attaching means for securing said canopy plate to said chuck body, and a sealing member disposed rearwardly of and in sealing engagement with said canopy plate and generally surrounding said aperture, said sealing member cooperating in sealing engagement with said master jaw in all positions of the master jaw relative to the chuck body to seal said opening and prevent entry of foreign material into said interior of said chuck body through said opening.

2. In a chuck assembly as set forth in claim 1 the further improvement wherein said canopy plate has an annular groove in said rear surface extending around said aperture and said sealing member comprises an annular sealing element supported within said annular groove.

3. In a chuck assembly as set forth in claim 2 the improvement wherein said sealing element is further characterized an elastomeric member.

4. In a chuck assembly as set forth in claim 1 the improvement wherein said master jaw has a forwardly facing sealing surface and said sealing member is disposed in sealing engagement with said forwardly facing sealing surface.

5. In a chuck assembly as set forth in claim 4 the improvement wherein said frontal surface and said sealing surface are disposed in a substantially common plane.

6. In a chuck assembly as set forth in claim 4 the improvement wherein said master jaw has a forwardly projecting boss extending into said aperture and a shoulder surrounding said boss and said forwardly facing sealing surface is defined by said shoulder.

7. In a chuck assembly as set forth in claim 6 wherein said chuck assembly includes a top jaw releasably connected to said master jaw the improvement wherein said boss extends through said aperture and said top jaw is connected to said boss forward of said aperture.

8. In a chuck assembly as set forth in claim 4 the improvement wherein said aperture is generally rectangular.

9. In a chuck assembly as set forth in claim 8 the improvement wherein said forwardly facing sealing surface has a generally rectangular outer peripheral edge and the dimensions of said generally rectangular outer peripheral edge are greater than the dimensions of said generally rectangular aperture.

10. In a chuck assembly as set forth in claim 1 the improvement wherein said attaching means comprises a plurality of threaded fasteners extending through said canopy plate and threadably engaged with said chuck body.

11. In a chuck assembly as set forth in claim 1 where the opening has a outer end opening radially outwardly through the chuck body the improvement wherein said chuck assembly includes a generally cylindrical shroud coaxially surrounding a portion of said chuck body and forming a closure for said outer end of said opening.

12. In a chuck assembly as set forth in claim 11 the improvement wherein said chuck assembly includes an annular sealing member coaxially surrounding an associated portion of said chuck body and disposed in sealing engagement with said shroud proximate the rear end of said shroud.

13. In a chuck assembly as set forth in claim 12, the further improvement wherein said chuck assembly includes another annular seal member coaxially surrounding an associated portion of said canopy plate and disposed in sealing engagement with said shroud proximate the forward end of said shroud.

14. In a sealed chuck assembly including a hollow generally cylindrical chuck body having a central axis and a radially disposed frontal surface, the chuck body having an opening in the frontal surface communicating with the interior of the chuck body, a movable master jaw supported by said chuck body and exposed within the opening for carrying a top jaw, and a jaw actuating mechanism within the chuck body for moving the master jaw within the opening and in a radial direction generally toward and away from the central axis, the improvement comprising a canopy plate having a radially disposed rear surface and an aperture therethrough, attaching means for securing said canopy plate in fixed position on said chuck body with said rear surface in generally overlying relation to said frontal surface and said aperture in general registration with said opening, an annular elastomeric sealing member supported in fixed sealing engagement with said rear surface and surrounding said aperture, said sealing member being disposed in sealing engagement with an associated forwardly facing surface defined by said master jaw, said sealing member cooperating in sealing engagement with said master jaw in all positions of said master jaw relative to said chuck body to seal said opening and prevent entry of foreign material into said chuck body through said opening.

15. In a machine tool chuck as set forth in claim 14 the further improvement where said frontal surface and said forwardly facing surface are disposed within a common radial plane.

16. A sealed chuck assembly comprising a hollow generally cylindrical chuck body having a frontal surface, a plurality of master jaws supported on said chuck body within equiangularly spaced openings in said frontal surface for radial movement relative to said chuck body and generally radially toward and away from each other, jaw actuating means within said chuck body for moving said master jaws toward and away from each other, a canopy plate attached to said chuck body and having a rear surface generally overlying said frontal surface, said canopy plate having a plurality of equiangular spaced apertures therethrough equal in number to said master jaws, each of said master jaws being exposed at an associated one of said apertures to facilitate attachment of a top jaw thereto, a plurality of annular sealing members equal in number to said apertures and disposed in sealing engagement with said rear surface, each of said annular sealing members surrounding an associated one of said apertures and sealing by engaging an associated one of said master jaws to seal said apertures in all positions of said master jaws relative to said chuck body whereby to prevent entry of foreign matter into said hollow chuck body through said apertures.

17. A sealed chuck assembly as set forth in claim 16 wherein said openings have outer ends opening radially outwardly through said chuck body, the improvement comprising a generally cylindrical shroud coaxially surrounding a portion of said chuck body and providing closures for said outer ends.

18. A sealed chuck assembly as set forth in claim 17 comprising an annular sealing member forming a seal between a rear end portion of said shroud and said chuck body.

19. A sealed chuck assembly as set forth in claim 18 comprising another annular sealing member forming a seal between a forward end portion of said shroud and said canopy plate.

* * * * *